US010071305B2

(12) United States Patent
Rogers et al.

(10) Patent No.: US 10,071,305 B2
(45) Date of Patent: Sep. 11, 2018

(54) METHOD AND SYSTEM FOR CONDUCTING AND LINKING PLAY OF A LOTTERY GAME WITH A TELEVISED GAME SHOW SIMULTANEOUSLY WITH A PLAY-AT-HOME VERSION OF THE GAME SHOW

(71) Applicant: Scientific Games International, Inc., Newark, DE (US)

(72) Inventors: Kyle Rogers, Cumming, GA (US); Steve Saferin, Atlanta, GA (US); Amy Hill, Cumming, GA (US); Tina Hoover, Newbury Park, CA (US); Amanda Saferin, Fort Worth, TX (US)

(73) Assignee: Scientific Games International, Inc., Newark, DE (US)

( * ) Notice: Subject to any disclaimer, the term of this patent is extended or adjusted under 35 U.S.C. 154(b) by 357 days.

(21) Appl. No.: 14/880,562

(22) Filed: Oct. 12, 2015

(65) Prior Publication Data

US 2016/0101351 A1 Apr. 14, 2016

Related U.S. Application Data

(60) Provisional application No. 62/062,176, filed on Oct. 10, 2014.

(51) Int. Cl.

*A63F 13/00* (2014.01)
*A63F 9/24* (2006.01)

(Continued)

(52) U.S. Cl.

CPC .......... *A63F 3/0605* (2013.01); *G07F 17/329* (2013.01); *G07F 17/3267* (2013.01); *A63F 2250/64* (2013.01)

(58) Field of Classification Search

CPC ...... A63F 3/0605; A63F 13/12; A63F 13/338; A63F 2300/409; A63F 2250/64;

(Continued)

(56) References Cited

U.S. PATENT DOCUMENTS 5,108,115 A * 4/1992 Berman .................. A63F 3/081 273/252
5,297,802 A * 3/1994 Pocock .................. A63F 3/062 273/269

(Continued)

FOREIGN PATENT DOCUMENTS

KR 20020065997 A * 8/2002

OTHER PUBLICATIONS

"Category:Lottery game shows in the United States". [online], [retrieved on Nov. 27, 2017]. <URL:https://en.wikipedia.org/wiki/Category:Lottery_game_shows_in_the_United_States>. 2 Pages.*

(Continued)

*Primary Examiner* — Milap Shah
(74) *Attorney, Agent, or Firm* — Dority & Manning, P.A.

(57) ABSTRACT

A system and method are provided for conducting a primary lottery game in conjunction with a televised game show and a play-at-home version of the show. In the primary lottery game, players purchase lottery tickets, with each ticket having a unique web code. Players of the primary lottery game become eligible to be a contestant in the show by accumulating a predefined set of game symbols in the lottery game. During broadcast of the game show, a plurality of game symbol codes are provided to at-home viewers of the show who are also players of the primary lottery game. The at-home viewers are able to access a website, enter the web code from their lottery ticket, enter one the game symbol (Continued)

codes broadcast with the game show, and play a web-based game to win a game symbol associated with the entered game symbol code.

15 Claims, 8 Drawing Sheets

(51) Int. Cl.
*A63F 3/06* (2006.01)
*G07F 17/32* (2006.01)

(58) Field of Classification Search
CPC .... G07F 17/32; G07F 17/326; G07F 17/3262; G07F 17/3267; G07F 17/329; G07F 17/42
See application file for complete search history.

(56) References Cited

U.S. PATENT DOCUMENTS

| | | | | | |
|---|---|---|---|---|---|
| 5,508,731 | A * | 4/1996 | Kohorn | A63F 13/12 | 348/E7.024 |
| 5,697,844 | A * | 12/1997 | Von Kohorn | A63F 13/12 | 348/E7.024 |
| 5,722,890 | A * | 3/1998 | Libby | A63F 3/081 | 463/16 |
| 6,439,997 | B1 * | 8/2002 | Brasseur | G06Q 30/02 | 463/40 |
| 6,488,280 | B1 * | 12/2002 | Katz | A63F 3/06 | 273/138.1 |
| 6,616,143 | B1 * | 9/2003 | Egner | A63F 13/12 | 273/430 |
| 6,749,198 | B2 | 6/2004 | Katz et al. | | |
| 6,783,460 | B2 * | 8/2004 | Galyean, III | A63F 13/12 | 348/552 |
| 7,686,684 | B2 * | 3/2010 | Schlau | G07F 17/32 | 463/16 |
| 2001/0003099 | A1 * | 6/2001 | Von Kohorn | A63F 13/12 | 463/40 |
| 2002/0037766 | A1 | 3/2002 | Muniz | | |
| 2004/0147319 | A1 * | 7/2004 | Aviyants | G07F 17/32 | 463/40 |
| 2004/0209665 | A1 | 10/2004 | Walker et al. | | |
| 2007/0129144 | A1 * | 6/2007 | Katz | G07F 17/32 | 463/30 |
| 2008/0220840 | A1 * | 9/2008 | Katz | G07F 17/32 | 463/16 |
| 2008/0300042 | A1 * | 12/2008 | Shimshi | G07F 17/32 | 463/17 |
| 2009/0117966 | A1 * | 5/2009 | Rogers | G07C 15/005 | 463/17 |
| 2009/0176549 | A1 * | 7/2009 | Saig | G07F 17/32 | 463/17 |
| 2009/0186677 | A1 * | 7/2009 | Corriveau | A63F 3/00157 | 463/13 |
| 2009/0249389 | A1 * | 10/2009 | Katz | G06Q 30/0241 | 725/32 |
| 2011/0059786 | A1 | 3/2011 | Walker et al. | | |
| 2011/0130187 | A1 * | 6/2011 | Veal | A63F 3/08 | 463/17 |
| 2011/0287835 | A1 * | 11/2011 | Tolbert | A63F 3/061 | 463/30 |
| 2013/0260857 | A1 * | 10/2013 | Nordby | G07F 17/329 | 463/17 |
| 2014/0295932 | A1 | 10/2014 | Irwin, Jr. | | |
| 2016/0101348 | A1 * | 4/2016 | Rogers | A63F 3/0605 | 463/17 |
| 2016/0101349 | A1 * | 4/2016 | Saferin | A63F 3/0605 | 463/17 |
| 2016/0101350 | A1 * | 4/2016 | Rogers | A63F 3/0605 | 463/17 |

OTHER PUBLICATIONS

PCT Search Report and Written Opinion, dated Jan. 15, 2016.

* cited by examiner

METHOD AND SYSTEM FOR CONDUCTING AND LINKING PLAY OF A LOTTERY GAME WITH A TELEVISED GAME SHOW SIMULTANEOUSLY WITH A PLAY-AT-HOME VERSION OF THE GAME SHOW

PRIORITY CLAIM

The present application claims priority to U.S. Provisional Patent Application Ser. No. 62/062,176, filed Oct. 10, 2014.

FIELD OF THE INVENTION

The present invention relates to conducting second chance game events (e.g., bonus games) associated with a primary lottery game, wherein the bonus game culminates in a televised game show having a play-at-home version.

BACKGROUND

Lottery games have become a time honored method of raising revenue for state and federal governments the world over. Traditional scratch-off and draw games have evolved over decades, supplying increasing revenue year after year. However, after decades of growth, the sales curves associated with traditional games seem to be flattening out. Consequently, both lotteries and their service providers are presently searching for new methods of increasing sales and expanding the gaming experience for players.

In one attempt to increase sales, United States lotteries have adopted second chance games where the consumer can enter losing lottery ticket codes on lottery Internet sites to play instant second chance games (also referred to as "bonus games") or to enter second chance drawings. However, for the most part, second chance games usually involve prizes of a minor nature compared to the main lottery games and, although having some impact, are generally not recognized as a significant promoter of sales of the primary game.

In an attempt to increase participation in the primary games, certain state jurisdictions in the United States have implemented "players' clubs" wherein participants register loosing primary tickets from multiple primary games into an online player account. The losing tickets are treated as entries into periodic drawings for secondary prizes. For example, Georgia sponsors a "PLAYERS CLUB" program wherein registered participants enter non-winning Georgia Lottery instant tickets via an online account into a second chance drawing program. Monthly drawings are conducted for an array of different awards, such as a monthly grand cash prize, featured prizes, and "points" awards that may be redeemed at a number of participating sponsors.

U.S. Pat. Pub. No. 2009-0117966 describes another method to enhance a player's experience in a lottery game, and thus encourage increased participation in the game. According to this patent application, a raffle number is assigned to each lottery ticket to be used in a subsequent raffle drawing. The raffle is conducted in conjunction with an independent third party event that is unrestrained by the lottery and awards a prize that is independent of the lottery. A typical third party event may be, for example, a televised contest or game show wherein contestants compete for an award. The lottery raffle prize is a function of the winning contestant's award. For example, the raffle prize may have a value equivalent to the value of the contestant's award, or may have an increased value based on a multiplication of the winning contestant's award. The lottery game component may have a theme based on the game show, and the raffle drawing can be conducted in conjunction with the game show, and may be televised during or immediately after the game show.

The lottery industry is thus continuously seeking new and creative game scenarios, particularly in regards to second chance games, that provide increased entertainment value to players, entice new players, and expand play of lottery games into a multi-faceted gaming experience beyond the mere purchase of a lottery ticket

SUMMARY OF THE INVENTION

Objects and advantages of the invention will be set forth in part in the following description, or may be obvious from the description, or may be learned through practice of the invention.

In a particular embodiment, a method is provided for conducting a lottery game in conjunction with a televised game show and a simultaneous play-at-home version of the televised game show. A primary lottery game is established in one or more lottery jurisdictions wherein players purchase lottery tickets to play the primary lottery game. A unique web code is provided on each lottery ticket. A televised game show is established in cooperation with the lottery game wherein players of the primary lottery game become eligible to be contestants in the televised game show by accumulating a predefined set of game symbols. The televised game show has one or more games wherein winning contestants are awarded a prize. During broadcast of the televised game show in the one or more lottery jurisdictions, a plurality of game symbol codes are provided to at-home viewers of the televised game show who are also players of the primary lottery game due to the fact that they also purchased one or more lottery tickets in the primary lottery game. Upon accessing a website made known to the at-home viewer (e.g., printed on the lottery ticket or provided during broadcast of the game show), the player enters the unique web code from their lottery ticket, selects and enters one of the game symbol codes broadcast with the televised game show, and plays a web-based game to win a game symbol associated with the entered game symbol code. The web-based game may be a version of the televised game show in that it at least has the same game theme, for example a MONOPOLY game theme.

The respective game symbols associated with the game symbol codes may be made known to the player prior to the at-home viewer selecting and entering one of the codes. In this manner, the at-home viewer can choose a game symbol that brings them closer to satisfying one of the predefined sets of game symbols. In another embodiment, the game symbols associated with the game codes are kept secret from the player until after completion of the web-based game.

The lottery tickets in the primary lottery game may also have a game symbol associated therewith (e.g., printed on the tickets or provided to the player via a website or other means) and the at-home viewers can also accumulate game symbols by purchase of lottery tickets in the primary lottery game. With this embodiment, the game symbols accumulated by the at-home viewers via play of the web-based games and play of the primary lottery game are combined to satisfy the predefined set of game symbols.

The game symbols associated with the lottery tickets and awarded in the web-based games may be for play of a bonus game component of the primary lottery game. This bonus game component may require participants in the bonus game to collect the predefined set of game symbols for entry into a pool. Periodically, bonus game drawings are conducted such that at least one of the participants in the pool is selected as a winner in each bonus game drawing, whereby the winner is invited to be an audience member in a future episode of the televised game show and eligible for selection as a contestant in televised game show. Alternatively, the winner may immediately be a contestant in a future episode of the televised game show without further requirement. Thus, the lottery game is coordinated with the televised game show so that contestants in the televised game show are the selected winners in the bonus game drawings. Eventually, a prize is awarded to winning contestants in the televised game show.

In one embodiment, the contestants in the televised game show are drawn from an audience assigned to the televised game show, wherein the audience, in whole or in part, is composed of winners from the bonus game drawings. The primary lottery game may be conducted in a plurality of different jurisdictions, for example in a plurality of different states within the United States, with each jurisdiction conducting one or more respective bonus game drawings and having a defined minimum number of winners from their respective bonus game drawings present in the audience. The game show contestants may then be randomly drawn from the entirety of the audience.

In an alternate embodiment, each jurisdiction may have a defined group of bonus game winners within the audience, wherein at least one game show contestant is randomly drawn from each of the groups. With this embodiment, each jurisdiction has at least one contestant in the show, which may further promote at-home viewing of the show, as well as participation in at-home play of the web-based game versions of the televised game.

In addition, each jurisdiction may be assigned non-contestant audience member spots to be awarded or distributed within their jurisdiction as they see fit. For example, these audience spots may be randomly awarded to non-winning players of the bonus game component. The number of audience spots assigned to the jurisdictions may be a function of the jurisdiction's respective participation in the primary lottery game, wherein jurisdictions having greater sales in the primary lottery game receive a greater number of audience spots. Thus, in these embodiments, the audience is composed of the non-contestant audience members and winners from the bonus game drawings, and the contestants in the televised game show are drawn from the bonus game winners present in the audience.

In an embodiment of the bonus game component, the participants are awarded a defined number of entries in the bonus game drawing, for example 3 entries, upon satisfaction of the predefined set of game symbols. The defined number of entries may be multiplied as a function of a multiplier symbol earned by the player. This multiplier symbol may be earned in a component of the bonus game (e.g., a sub-game or drawing), or "purchased" by the player, for example with loyalty or club points earned by the player. In an alternate embodiment, the multiplier symbol is earned by the player in a separately conducted second primary lottery game that is linked to the first primary game through the multiplier symbol or other prize or odds enhancement mechanism. This embodiment may serve to generate increased sales in the second primary lottery game.

The method may include providing participants in the bonus game with a bonus game board that tracks status of the bonus game symbols acquired by the player. This game or status board may be a virtual game board provided via a website accessible by the players. This embodiment lends itself well to promoting a game theme, such as a MONOPOLY game theme, wherein the bonus game symbols identify sets of property locations on the MONOPOLY game board. The participants may have individual player accounts that are accessible via the website, wherein the accounts include the player's virtual game board updated with a status of the bonus game symbols accumulated by the player, as well as any other aspect of the player's involvement with the primary lottery game or bonus game.

It should be appreciated that the present game method is not limited to any particular type of first or second primary lottery games. In one embodiment, the primary game is a lottery draw game (e.g., a "Pick-4" game wherein players attempt to match selected player indicia with four indicia randomly drawn from a field of indicia) and the lottery game tickets are lottery draw tickets having at least one entry into the draw game. These tickets may be purchased by players at an authorized lottery retail establishment, via the Internet, and so forth. The lottery tickets have one or more of the first bonus game symbols provided thereon (or associated therewith), such as an Ace-of-spades where the first game symbols are divided into groups of playing cards and the players are required to collect a predefined set of cards for initial entry into the bonus game.

If a second primary lottery game is implemented, for example to provide multiplier factors or other prize/odds enhancement symbols related to the bonus game, such second primary game may also be a lottery game, including another independently conducted draw game with its own prize structure. In a particular embodiment, however, the second primary game is an instant ticket lottery game and the second game tickets are instant lottery tickets having a second bonus game symbol provided thereon that is visually linked to a particular one of the predefined sets of first bonus symbols. For example, the bonus symbol may be a "3× multiplier for ♠", wherein a player's initial entry into the bonus game with a particular predefined set of spades is enhanced by a factor of three (e.g., an initial 10 entries becomes 30 entries).

The game symbol codes may be episode specific and valid only once and only during the broadcast time of the particular episode of the televised game show in which the codes are provided. The same game symbol codes may be provided to all of the lottery jurisdictions. In another embodiment, the game symbol codes are specific or unique to a particular geographic region, which may correspond to a single one or combination of lottery jurisdictions. Thus, the game symbol codes are valid only in a specific geographic region corresponding to the lottery jurisdiction in which the episode of the televised game show is broadcast. For example, the primary lottery game may be established in a plurality of geographically different lottery jurisdictions, and the televised game show is broadcast in each of the different lottery jurisdictions. The game symbol codes assigned to each lottery jurisdiction are unique such that the at-home viewer must use the game symbol codes assigned to their respective lottery jurisdiction to play the web-based game and acquire the game symbol associated with the code they selected.

BRIEF DESCRIPTION OF THE DRAWINGS

A full and enabling description of the present invention is provided herein, with reference to particular embodiments depicted in the attached drawings and described below. Certain of the drawings and related description include depictions or reference to characters, images, trademarks, logos, and the like, associated with the well-known board game MONOPOLY. "MONOPOLY" and the related graphics in the drawings (including all names, characters, images, trademarks and logos) are protected by trademark, copyrights, and other Intellectual Property rights owned by Hasbro.

DETAILED DESCRIPTION

Figure 1:
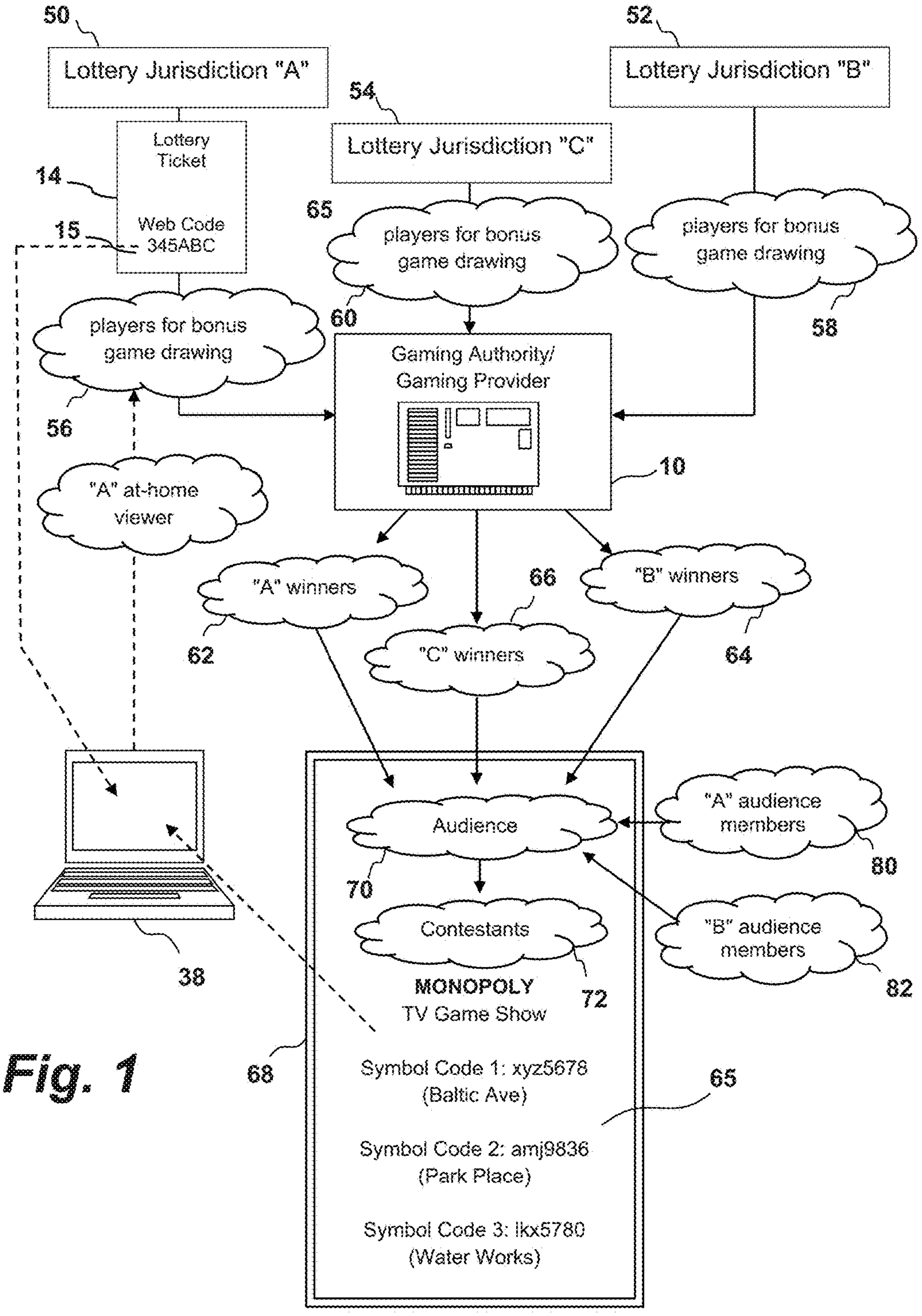
FIG. 1 is a diagram illustration of a system and method for conducting a lottery bonus game coordinated with a televised game show and a play-at-home version of the game show in accordance with principals of the invention.

Reference will now be made in detail to embodiments of the inventive methods and systems, one or more examples of which are illustrated in the drawings. Each embodiment is presented by way of explanation of the invention, and not as a limitation of the invention. For example, features illustrated or described as part of one embodiment may be used with another embodiment to yield still a further embodiment. It is intended that the present invention include these and other modifications and variations as come within the scope and spirit of the invention.

In general, the present disclosure is directed to computer implemented methods and systems for conducting a second chance or bonus game component of a primary lottery game that is coordinated with a televised game show and a play-at-home version of the game show. For sake of example only, the following discussion relates to embodiments of the invention drawn to primary lottery games and bonus games sponsored by state or other jurisdictional authorities. It should be appreciated, however, that the system and method are just as applicable to a bonus game component linked to any manner of primary games, such as multiple primary games conducted within a gaming establishment (e.g., a casino) for patrons of such establishment.

As their name implies, second chance or bonus games are a means for a game player to win a prize with an apparent losing ticket from an initial or primary game. Traditionally, these bonus games are linked to non-winning instant (scratch-off) game tickets, and certain embodiments described herein relate to this scenario. It should be appreciated, however, that the present method and system are not limited to any particular type of primary lottery game, and may include, for example, a primary draw-type lottery game. In addition, the invention is not limited to non-winning tickets in the primary lottery game. Winning tickets may also be entered into the bonus game component.

Referring to FIG. 1, a primary lottery game is established in one or more lottery jurisdictions. Three separate lottery jurisdictions 50 (Jurisdiction A), 52 (Jurisdiction B), and 54 (Jurisdiction C) are depicted in FIG. 1. These jurisdictions 50-54 may be multiple states, or defined geographical regions within a single state, or regions falling within the same governmental gaming regulations, or regions defined solely by the gaming provider or gaming authority, and so forth. For play of the primary lottery game, players purchase lottery tickets 14 within their respective jurisdiction A, B, C, which may be instant scratch-off tickets, online terminal-issued tickets for a draw game (e.g., POWERBALL tickets). A unique web code 15 is provided on each lottery ticket 14. This web code 15 may be, for example, a unique serial number, validation code, or the like, or may be in addition to a serial number or validation code provided on the ticket for other purposes.

A televised game show 68 is established in cooperation with the primary lottery game wherein players of the primary lottery game become eligible to be contestants in the televised game show 68 by accumulating a predefined set of game symbols, which, in one embodiment, may be used to participate in a bonus game component of the primary lottery game. For example, the bonus game component of a primary lottery game may be coordinated with the televised game show 68 wherein contestants 72 compete in one or more games or contests to win a prize. The contestants 72 are generated through participation in the bonus game component wherein audience members or contestants are selected in a drawing, as discussed in greater detail below. The particular types of games or contests in the televised game show 68 are not a limiting feature of the invention, and may be games of skill or chance. A single player may compete against the house in the games, or contestants may compete against each other.

The bonus game component of the primary lottery game is coordinated with the game show 68 to the extent that the game show 68 is essentially the venue in which the bonus game is finally concluded. The televised game show 68 may be produced with the assistance of the gaming authority, game provider, or any other entity associated with the primary lottery game. For example, a game provider (e.g., provides the primary lottery game to multiple jurisdictions) may be partnered with a game show producer on a local or national level, and the game show may be televised at a local or national level. The game provider may have in-house production capabilities for producing the game show.

Figure 2:
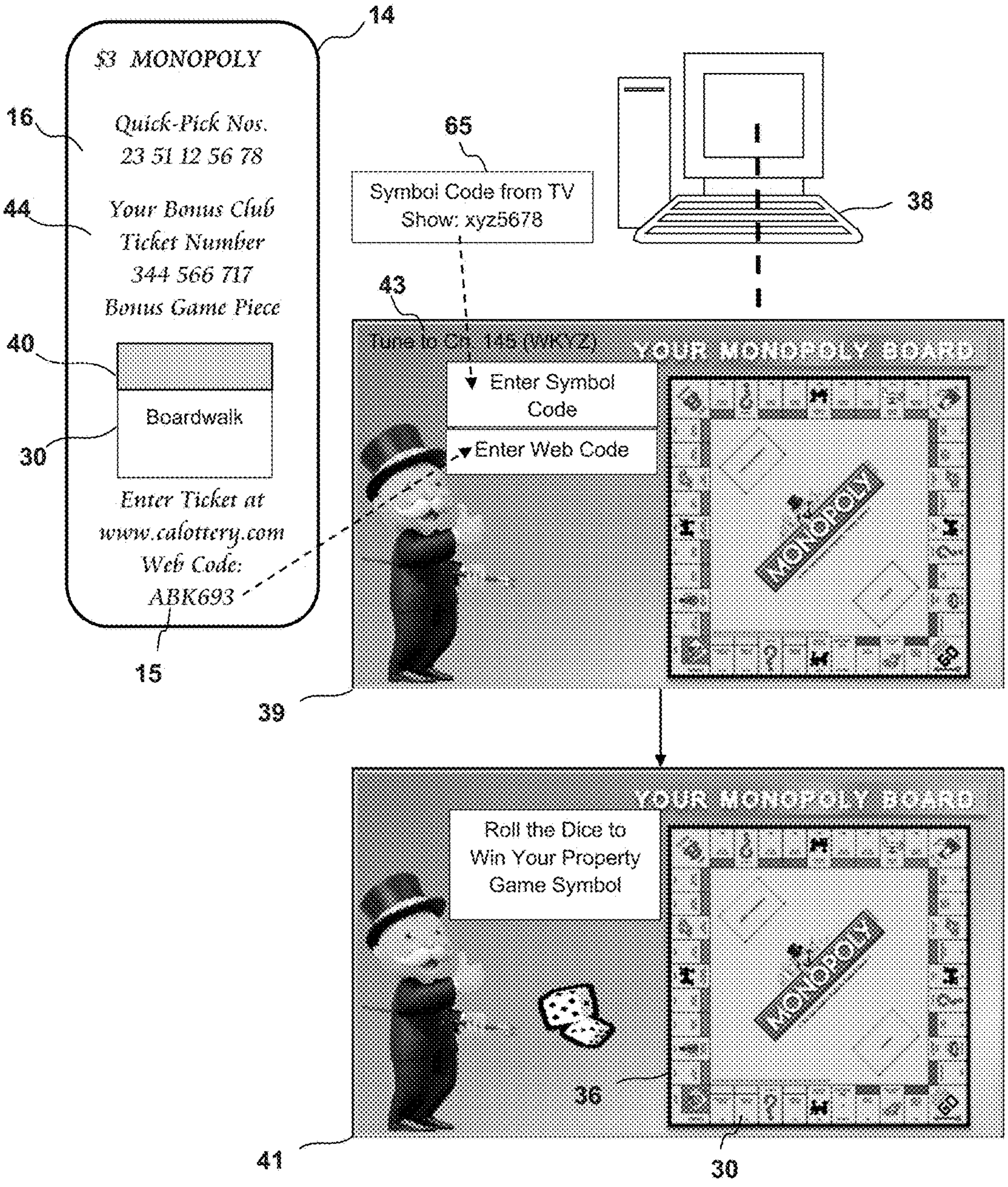
FIG. 2 is a diagram illustration of an embodiment of the play-at-home version of the game show.

Referring to FIGS. 1 and 2, during broadcast of the televised game show 68 in the one or more lottery jurisdictions A, B C, a plurality of game symbol codes 65 are provided to at-home viewers of the televised game show 68 who are also players of the primary lottery game due to the fact that they also purchased one or more lottery tickets 14 in the primary lottery game. Thus, the at-home viewers are also in possession of one or more web codes 15 from one or more lottery tickets 14. A website is identified on the lottery ticket 14 (or otherwise made known to the player), which is accessed by the viewer via any suitable Internet-enabled device 38 (e.g., a computer, smart phone, PDA, etc.). Upon initial access to the website, the viewer may be provided with a channel locator 43 (FIG. 2) that directs the viewer to the appropriate television station to watch the televised game show 68 and learn the game symbol codes 65. The at-home viewer enters the web code 15 from their lottery ticket, as well as one of the game symbol codes 65, as indicated in the screen shot 39 of FIG. 2. The at-home viewer is then presented with a play-at-home game web-based game to acquire as game symbol associated with the game symbol code 65 they selected, as depicted in the screen shot 41 of FIG. 2. The web-based game may be a version of the televised game show in that it at least has the same game theme, for example a MONOPOLY game theme that is common to the primary lottery game and the bonus game component. For example, in the web-based game depicted in the screen shot 41, the at-home viewer is given a simulated dice roll and is awarded a corresponding property (a game symbol 30) on a MONOPOLY game board. The web-based game may be implemented so that the at-home player always "wins" the predetermined game symbol 30 associated with the game symbol code they entered. For example, the dice roll in the embodiment of FIG. 2 will always result in the player's monopoly game piece landing on the predetermined property (game symbol 30) associated with the selected game symbol code 65.

In a particular embodiment, the game symbol codes 65 limit at-home play of the web-based game to a time corresponding to the broadcast time of the televised game show 68 within the lottery jurisdiction where the at-home viewer is located. In other words, the game symbol codes 65 are only valid during broadcast of the game show 68.

The at-home viewer may be limited to the number of web codes 15 that may be entered during the active time of any one game symbol code 65. For example, the at-home viewer may only play one or two of the web-based games during a single broadcast of the game show 68.

The game symbol codes 65 may be episode specific and valid only once and only during the broadcast time of the particular episode of the televised game show 68 in which the game symbol codes were provided. The same game symbol codes 65 may be provided to all lottery jurisdictions A, B, C. In another embodiment, the game symbol codes 65 are specific or unique to a particular geographic region, which may correspond to a single jurisdiction or combination of lottery jurisdictions A, B, C. Thus, the game symbol codes 65 are valid only in a specific geographic region corresponding to the lottery jurisdiction in which the episode of the televised game show 68 is broadcast. For example, the primary lottery game may be established in a plurality of geographically different lottery jurisdictions A, B, C, and the televised game show is broadcast in each of the different lottery jurisdictions. In this scenario, the game symbol codes 65 assigned to each lottery jurisdiction A, B, B are unique such that the at-home viewer must use one of the game symbol codes 65 assigned to their respective lottery jurisdiction to play the web-based games.

As mentioned above and depicted in FIG. 2, the prize award for the web-based games are the game symbol associated with the selected game symbol code 65, for example a property location on a MONOPOLY game board 36. The lottery tickets 14 in the primary lottery game may also have a game symbol 30 associated therewith (e.g., printed on the tickets or provided to the player via a website or other means) and the at-home viewers can also accumulate game symbols 30 by purchase of lottery tickets 14 in the primary lottery game. With this embodiment, the game symbols 30 accumulated by the at-home viewers via play of the web-based games and play of the primary lottery game are combined to satisfy the predefined set of game symbols.

The game symbols 30 associated with the lottery tickets 14 and awarded in the web-based games may be used for play of the bonus game component of the primary lottery game described above with reference to FIG. 1. Participants in the bonus game are required to accumulate a predefined set of the game symbols 30 to advance further in the bonus game and become eligible for selection as a contestant in a future episode of the televised game show 68. The play-at-home web-based games are another means for participants in the bonus game component to accumulate the game symbols 30. Thus, the web-based games are linked to the primary lottery game in that the lottery tickets 14 in primary lottery game also have a game symbol 30 associated therewith. The at-home viewers also accumulate game symbols 30 by purchase of lottery tickets 14 in the primary lottery game, wherein game symbols 30 accumulated by the at-home viewers via play of the web-based games and play of the primary lottery game are combined to satisfy the predefined set of game symbols 30 required to advance in the bonus game component.

In a particular embodiment, the bonus game component may be administered through a players' club associated with a particular lottery jurisdiction, wherein players establish an individual on-line account maintained by the lottery authority for the purpose of entering, tracking, and qualifying for and playing the bonus games, as well as any other aspect of the player's involvement with the lottery. The players access their account via an Internet enabled device at the website address provided on the ticket 14 (or otherwise made known to the players). Each player may have an individual account number. The game symbols 30 accumulated by the at-home viewer by play of the web-based games can be automatically recorded in the player's account. As discussed below, means are also provided for the player to enter into their account game symbols accumulated by purchase of primary lottery tickets 14.

Referring again to FIG. 1, each lottery jurisdiction 50-52 conducts its own primary lottery game with respective tickets 14 and bonus game drawings, as discussed in greater detail below. Thus, each jurisdiction 50, 52, and 54 generates a respective pool 56, 58, 60 of players entered into a bonus game drawing. In the illustrated embodiment, players qualify for this pool by collecting a defined set of the bonus game symbols 30 (FIG. 2) from participation in the primary lottery game and the play-at-home web-based games.

Periodically, the gaming authority, game provider, or combination of both, conducts a bonus game drawing wherein one or more winners 62, 64, 66 are selected (e.g., randomly drawn) from the pools 56, 58, 60. For example, in the embodiment of FIG. 1, multiple winners from jurisdiction "A" define a group of "A" winners 62 that are eligible to become contestants in the televised game show. Likewise, multiple winners from jurisdictions "B" and "C" are selected and define groups of winners 64 and 66, respectively, which are eligible to become contestants in the game show 68. At least one bonus game drawing is conducted in each jurisdiction before each of the televised game shows 68.

Each jurisdiction may be assigned a minimum number of winners in the groups 62, 64, and 66 (e.g., 100 hundred winners from each jurisdiction). Other factors may warrant assigning certain of the jurisdictions 50, 52, and 54 a greater number of winners, such as volume of participation by players within the jurisdiction that participated in the primary game, geographic size of the jurisdiction, revenue generated in the jurisdiction, and so forth. It should be understood that a respective pool 56, 58, and 60, or group of winners 62, 64, 66, may be one or more players.

In the embodiment of FIG. 1, the contestants 72 in the televised game show 68 are drawn from an audience 70 assigned to the show. As indicated by the directional arrows in FIG. 1, the audience is, in whole or in part, composed of the groups of winners 62, 64, and 66 from the bonus game drawings. The contestants 72 may then be randomly drawn from the entirety of the audience 70 such that no one jurisdiction is guaranteed a contestant 72 in the game show 68.

In an alternate embodiment, the groups of winners 62, 64, and 66 are still assigned to the audience 70. However, at least one game show contestant 72 is then randomly selected from each group 62, 64, 66 to participate in the game show 68 such that each participating jurisdiction has at least one contestant in the game show 68. In this embodiment, the identity of the particular groups 62, 64, and 66 may be maintained in the audience. For example, each group may have an assigned seating section, or may wear respective identifying clothing, or the like. With this embodiment, each jurisdiction has at least one contestant in the show, which may promote at-home viewing of the show within each respective jurisdiction.

FIG. 1 depicts that the contestants 72 are drawn from the audience 70. In an alternate embodiment, the contestant selection process may be done completely outside of and before the game show, and may be conducted by a drawing held by the gaming authority/game provider in a separate event.

In addition, referring to FIG. 1, each jurisdiction may be assigned non-contestant audience member spots 80, 82 to be awarded or distributed within their jurisdiction. For example, these audience spots 80, 82 may be randomly awarded to non-winning players of the bonus game component. The number of audience spots 80, 82 assigned to the jurisdictions may be a function of the respective jurisdictional participation in the primary lottery game, wherein jurisdictions having greater sales in the primary lottery game receive a greater number of audience spots 80, 82. Thus, in the embodiment of FIG. 1, the audience 70 is composed of the non-contestant audience members 80, 82 and winners 74, 76, from the bonus game drawings, and the contestants in the televised game show are drawn from the bonus game winners present in the audience. In an alternate embodiment, the audience 70 may be composed of the non-contestant audience members 80, 82, and the contestants in the game show are pre-selected.

The televised game show 68 is prepared for broadcast to all of the lottery jurisdictions A, B, C, for example via any pre-arranged broadcast scheme involving studios, affiliates, and the like. For example, lottery jurisdiction A may correspond to the state of South Carolina, lottery jurisdiction B may correspond to the state of Georgia, and lottery jurisdiction C may correspond to the state of Florida. The televised game show 68 will be broadcast to these three geographically defined lottery jurisdictions.

Figure 3:
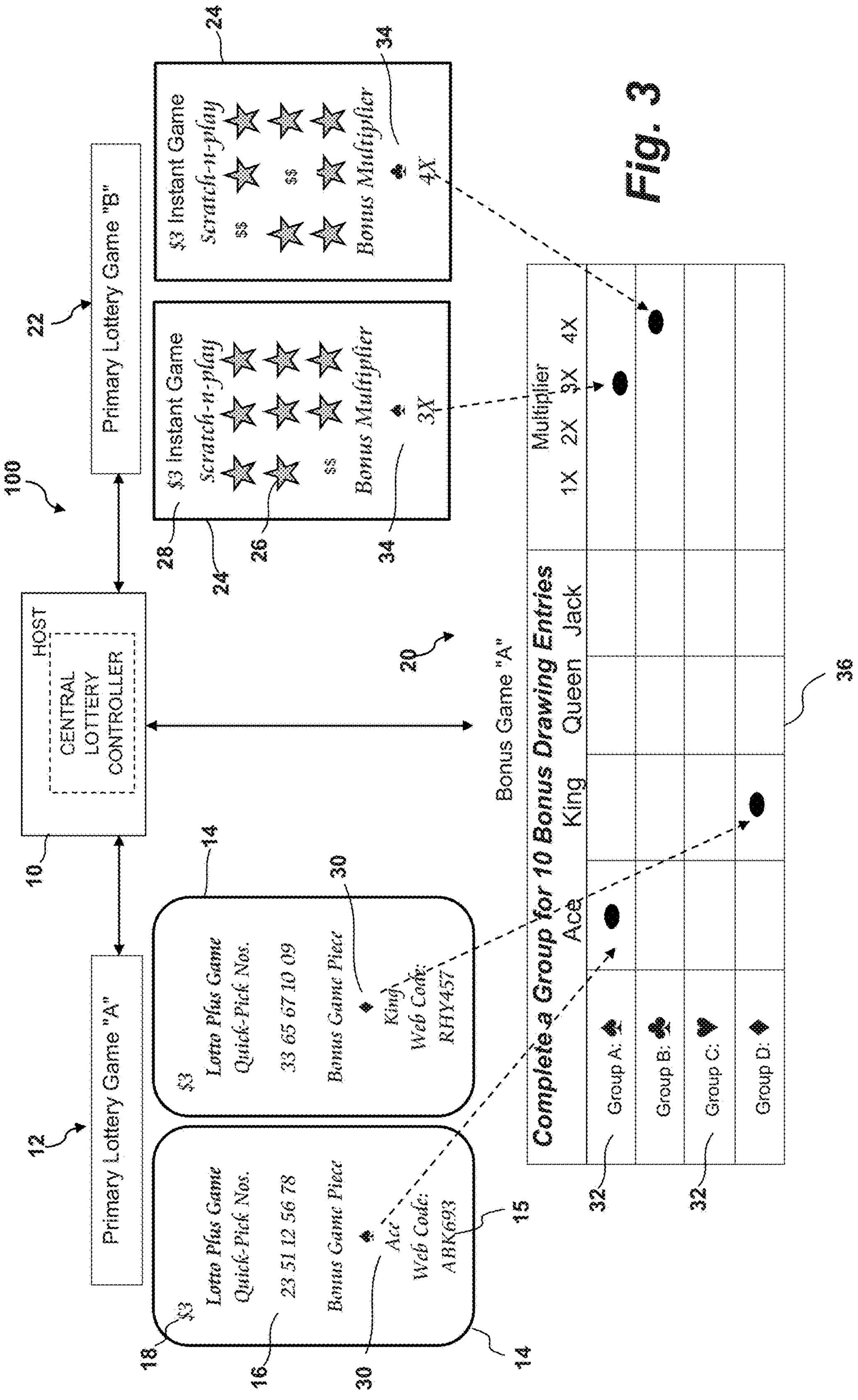
FIG. 3 is a diagram illustration of a system and method with components for primary lottery games and a bonus game in accordance with principals of the invention.
Figure 4:
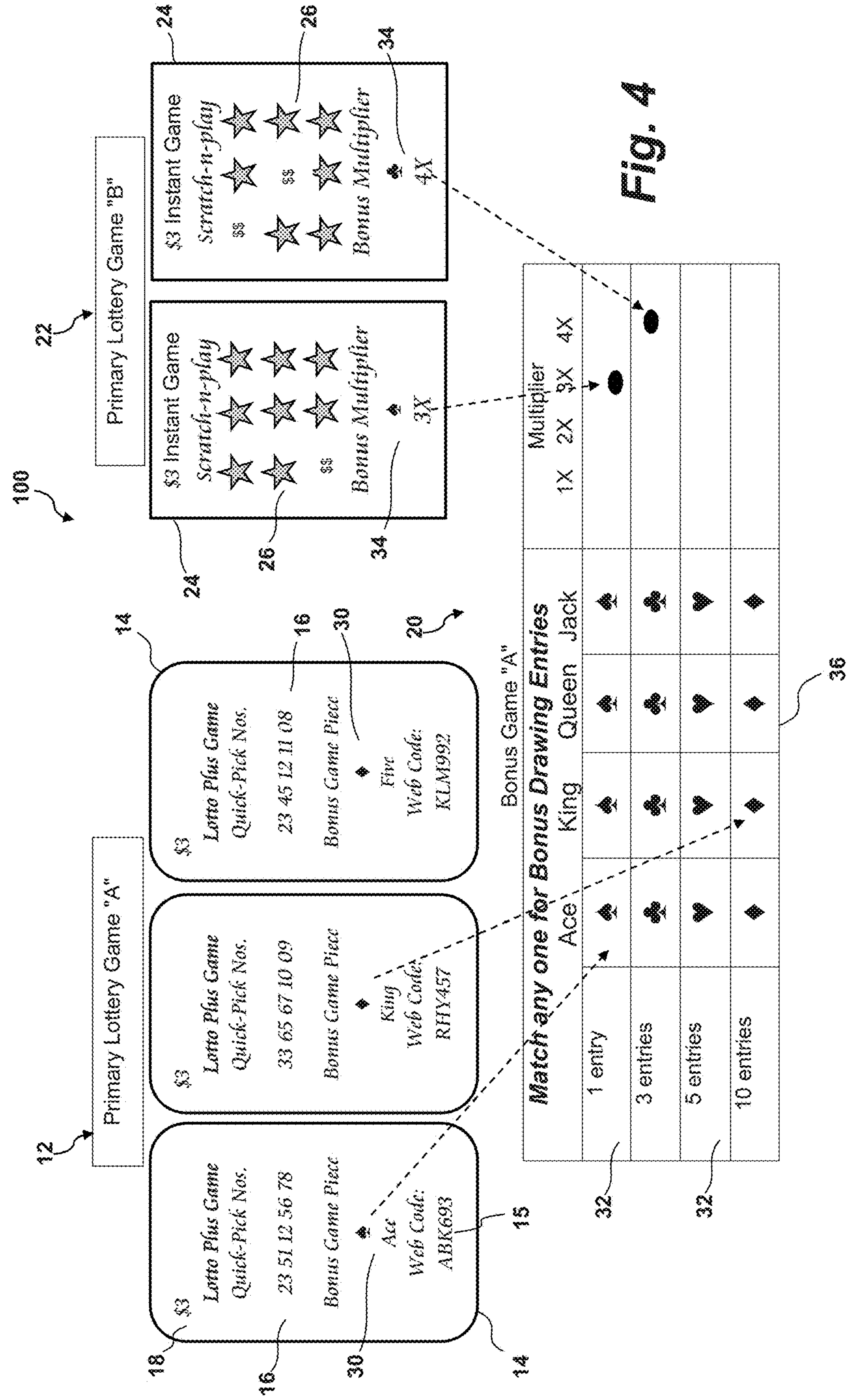
FIG. 4 is a diagram illustration of an alternate system and method with components for primary lottery games and a bonus game in accordance with principals of the invention.

Referring to FIGS. 3 and 4, aspects of a primary lottery game and associated bonus game component method and implementing system 100 whereby players are eventually qualified for participation in the televised game show 68 discussed above. The method and system are hosted by a gaming or lottery authority (e.g., a sponsoring state or other jurisdictional entity) through a host controller 10, which may be any hardware/software architecture necessary for conducting the games in a given jurisdictional area. A first primary game 12 ("Primary Lottery Game A") is depicted as a lottery draw game wherein players are issued first game tickets or entries 14 in the form of lottery tickets for play of the lottery draw game in a conventional manner. For example, the lottery tickets 14 include any manner of game indicia 16, 18 for play of the draw game, including price of the ticket, the player's game numbers, bar codes, security features, and the like. As mentioned above, each ticket 14 includes the web code 15. The type or manner of game indicia is not limiting factor of the invention and includes any indicia necessary or desired to conduct the first primary game 12.

It should be readily appreciated that the gaming authority may employ, contract with, or otherwise cooperate with any other party or entity to implement the present method embodiments on behalf of the gaming authority, such as a game provider that prints lottery tickets or renders information/database management services to the gaming authority.

A bonus game 20 is established that is played separate from the first primary game 12. The bonus game 20 has its own set of rules and prize structure and is generally conducted completely independent of the primary lottery game. Various types of second chance or bonus games 20 are well known in the lottery industry, and any one or combination of these games may be utilized in the present invention. In the embodiment depicted in FIG. 3, the bonus game 20 is referenced as a "drawing" type of game (i.e., a raffle). Players are granted entries or tickets into a random drawing wherein, for each drawing, at least one winning selections is drawn from the pool of entries.

Still referring to the embodiment of FIG. 3, first bonus game symbols 30 are associated with the lottery game tickets 14, for example by being printed on the game tickets as depicted in FIG. 3. In another embodiment, the game tickets 14 may provide instructions to the player as to how to acquire a unique associated bonus game symbol 30 that is revealed to the player via a website. The players are required to collect a predefined set or grouping (the terms "sets" and "groups" are used interchangeably herein) of different ones of the bonus game symbols 30 before receiving one or more initial entries into the bonus game 20. A predefined set includes a set of one game symbol 30 or a set of a plurality of game symbols 30. As mentioned, the method is not limited to any particular grouping technique or scheme. For example, sets may be defined by color, theme, number, location on a board or matrix, and so forth, so long as the sets are readily understood and identified to the players. In the embodiment of FIG. 3, the predefined sets 32 are face cards from a conventional playing deck. Group A corresponds to: A♠, K♠, Q♠, and J♠. Group B corresponds to: A♣, K♣, Q♣, and J♣. Group C corresponds to: A♥, K♥, Q♥, and J♥. Group D corresponds to: A♦, K♦, Q♦, and J♦. In order to qualify for play of the bonus game 20, a player would need to satisfy any one of these groups with the game symbols 30 they have accumulated from purchase of first game tickets 14.

The game symbols 30 on the game tickets 14 of FIG. 3 are the A♠ and K♦, respectively. It should be appreciated that the game symbols 30 could be cards or items that are not within any of the predefined groups 32. For example, the game symbols 30 on game tickets 14 may be 10♠ or 8♠, which are not face cards belonging to any one of the predefined groups 32 and thus have no value in the bonus game 20.

If the one of the groups 32 are satisfied by the player's accumulation of game symbols 30, then the player is entered into the bonus game 20 and is granted a defined number of entries into the bonus game drawing. For example, in the embodiment of FIG. 3, the player is granted 10 entries into the bonus game drawing 20 for each group 32 collected by the player.

The players may enter their primary lottery game tickets 14 into the bonus game program via a website maintained by the gaming authority. It is not a requirement that only non-winning tickets 14 can be entered. For example, all tickets 14 from the primary lottery game may be played, including winning tickets. The tickets are "entered" in the sense that each game ticket or entry 14 is uniquely identified by a code or other means that the player provides to the game authority or administrator, for example via a website maintained by the game authority or in person at an authorized game or lottery location. Once verified, the ticket 14 is entered into the bonus game 20 and the game symbol 30 associated with each tickets are recorded or credited in the player's account.

A particular embodiment of the primary lottery game may include the linking of a second primary lottery game to enhance the player's odds of success or prize in the bonus game. This embodiment is also illustrated in FIG. 3, wherein a second primary game 22 ("Primary Lottery Game B") is established wherein players are issued second game tickets or entries 24 for play of the second primary game. In the embodiment depicted in FIG. 3, the second primary game 22 is a conventional instant scratch-off lottery game wherein players are issued second game tickets 24 in the form of conventional scratch-off lottery tickets having any manner of game indicia 26, 28 for play of the instant games, including price of the ticket, game symbols underlying a scratch-off coating, bar codes, security features, and the like. Conventional lottery scratch-off tickets are well known in the art and need not be described in detail herein.

The second game tickets 24 are "linked" to the bonus game 20 for the first primary game 22 such that players increase their chance of success in the bonus game 20 by entering the second game tickets 24 (winning or non-winning) into the bonus game 20. The primary games 12, 22 and bonus game 20 are conducted such that (i) play of the first primary game 12 does not require play of the bonus game 20 or the second primary game 22, (ii) play of the second primary game 22 does not require play of the first primary game 12 or the bonus game 20, and (iii) play of the bonus game 20 requires play of the first primary game 12 but not the second primary game 22. Thus, the gate to the bonus game 20 is play of the first primary game 12. The player cannot enter the bonus game 20 simply by playing the second primary game 22. Play of the second primary game 22 may, however, increases the player's likelihood of success or enhance a prize in the bonus game 20 by various means. For example, in one embodiment described in greater detail below, entry of game tickets 24 from the second primary game 22 may increase the number entries a player is granted in the bonus draw game 20, or increase a prize awarded in the bonus game 20, or increase the number of bonus games 20 the player is eligible to play, and so forth.

A second type of bonus game symbol 34 is associated with (e.g., printed on or accessible via a website) on the second game tickets 24. The second bonus game symbols 34 are visually linked to a particular one of the predefined groupings 32 of first bonus symbols to the extent that a player can readily visually associate the symbol 34 with a particular group 32. For example, referring to the embodiment of FIG. 3, the second bonus game symbols 34 printed on the second game tickets 24 are "♠3×" and "♣4×", respectively. A player can readily appreciate that "♠3×" is a multiplier (factor of 3) associated with the Group A, and that "♣4×" is a multiplier (factor of 4) associated with Group B.

The player's initial entry into the bonus game 20 (granted upon accumulation of one or more of the predefined sets 32 of first bonus game symbols) may be enhanced by one or more of the second bonus game symbols 34 accumulated by the player that are linked to the respective predefined set 32 of first bonus game symbols 30. For example, referring to FIG. 3, the bonus game 20 is a drawing event wherein a "winner" is randomly selected from a pool of entries, the winner receiving a prize award of some value. The player is granted 10 initial entries into the drawing upon accumulation of one of the predefined sets 32 of first bonus game symbols 30. The player has also accumulated a 3× multiplier for Group A and a 4× multiplier for Group B. If the player satisfies Group A, then the 10 initial entries are increased to 30. If the player satisfies Group B, then the 10 initial entries are increased to 40.

In certain embodiments, the player can accumulate multiple sets 32 of bonus game symbols between bonus game drawings, wherein the player's number of entries in the next scheduled bonus game 20 is the cumulative total from all of the accumulated sets. For example, if the player accumulates Group A and Group B, then he is granted 20 initial entries in the bonus game 20. These initial entries may be increased by any second bonus game symbols 34 acquired by the player that relate to Group A or Group B.

The embodiment of a multiplier that increases the player's odds of winning is only one example of an enhancement to play of the bonus game 20. In another embodiment, the second bonus game symbol 34 may increase the prize award in the bonus game 20 resulting from the player becoming a winning contestant in the televised game show. For example, a multiplier of 3× may apply to a prize award from the game show of $10,000, resulting in a final prize of $30,000. In still another embodiment, the second bonus game symbol 34 may identify an "add-on" prize that is in addition to the bonus game entries or bonus game price, such as a $500 shopping spree, and so forth. It should be appreciated that the type of enhancement provided by the second bonus game symbols 34 can vary within the scope and spirit of the invention.

FIG. 4 depicts and embodiment 100 of a method and associated system that is similar in many respects to the embodiment of FIG. 3. In this embodiment, however, qualification for entry into the bonus game 20 only requires one particular bonus game symbol 30. In other words, the predefined sets 32 include one or more game symbols 30. For example, the player has accumulated three first game symbols 30 from the first primary lottery game 12: ♠A, ♦K, and ♦5. The ♠A entitles the player to 1 entry in the bonus game 20, and the ♦K entitles the player to 10 entries in the bonus game. The ♦5 does not match one of the predefined sets 32 and has no value in the bonus game 20. As with the embodiment of FIG. 1, the player can accumulate multiple sets 32 between bonus games, wherein the player's entries in the next scheduled bonus game 20 is the cumulative total from all of the accumulated sets.

In certain embodiments, the players are provided with a bonus game board 36 that tracks the first bonus game symbols 30 and second bonus game symbols 34 acquired by the player. In the embodiment of FIG. 4, the game board 36 is a tabular compilation wherein positions in the table are marked or highlighted with the player's accumulated symbols, as indicated by the arrows in FIG. 4. It should be appreciated that any manner or configuration of game board 36 may be designed based on the type of primary and secondary games 12, 22, and bonus game 20.

In a particular embodiment, the game board 36 may be a virtual board accessed by the player via a website that automatically updates and visually associates the second bonus game symbols 34 with their respective predefined set 32 of first bonus game symbols 30, as in FIG. 3. For example, individual players may establish a respective bonus game account via the website, wherein each player is shown their own individualized game board 36 that is updated with a status of the first bonus game symbols 30 and second bonus game symbols 34 accumulated by the player. In an alternate embodiment, players may be provided with a “hard” game board (e.g. printed on paper or card stock) or “electronic” game board (e.g., application of a wireless device) that the player updates as the games progress.

Figure 5A:
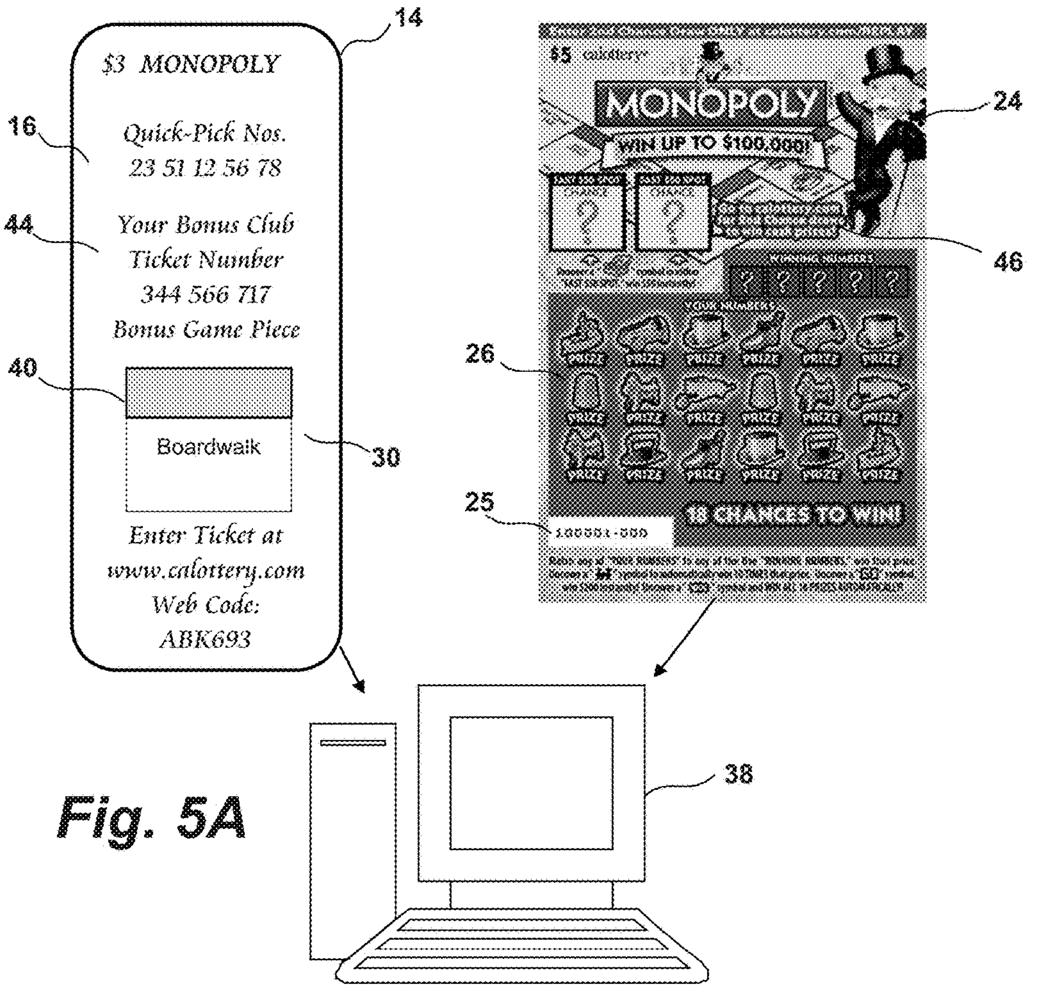
FIG. 5A is an illustration of game components, including lottery tickets and game board, that may be used in an embodiment in accordance with the invention.

FIGS. 5A through 5E relate to an embodiment of a game method and system having a particular game theme. Referring to FIG. 5A, a primary lottery game ticket 14 is embodied as a lottery ticket for a lottery draw game. The ticket 14 includes the player’s draw numbers, as well as any other indicia necessary to conduct the first primary game. The ticket 14 includes indicia identifying a MONOPOLY game theme. In accordance with the game theme, the ticket 14 includes a first bonus game symbol 30 depicted as one of the real estate properties 40 from a conventional MONOPOLY board game, in this case the widely recognized “Boardwalk” property. Thus, with this embodiment, the first bonus game symbols 30 identify sets of property locations on the MONOPOLY game board. Instructions are also provided on the ticket 14 for the player to enter the ticket 14 into the bonus game 20. For example, the player is directed to access a lottery website at the web address printed on the ticket via any suitable Internet enabled device 38 (e.g., a computer, smart phone, or the like).

As mentioned above, the bonus game 20 may be administered through a players’ club, wherein players establish an individual account maintained by the lottery authority for the purpose of entering, tracking, and qualifying for and playing the bonus games. The players access their account via an Internet enabled device at the website address provided on the ticket 14. Each player may have an individual account number.

Figure 5B:
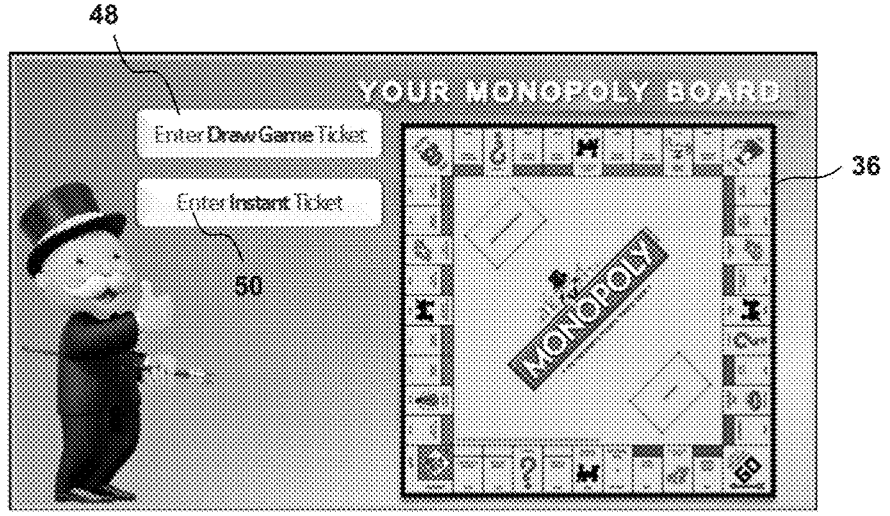
FIGS. 5B through 5E are illustrations of additional game components that may be used with the embodiment of FIG. 5A.

FIG. 5B is a screen shot illustrating entry of the primary lottery game ticket 14 and, if utilized, a secondary primary game ticket 24 into the bonus game. At window 48, the player is instructed to enter the draw ticket club number 44 (or other unique identifying information, such as a serial number or the like) from the ticket 14 of FIG. 5A. At window 50, the player is instructed to enter identifying information from the scratch-off ticket 24 of FIG. 5A, such as the serial number 25. A game board 36 is also provided, which is updated with first game symbols 30 and, if utilized, second game symbols 34 upon entry and verification of the respective game tickets 14, 22.

Figure 5C:
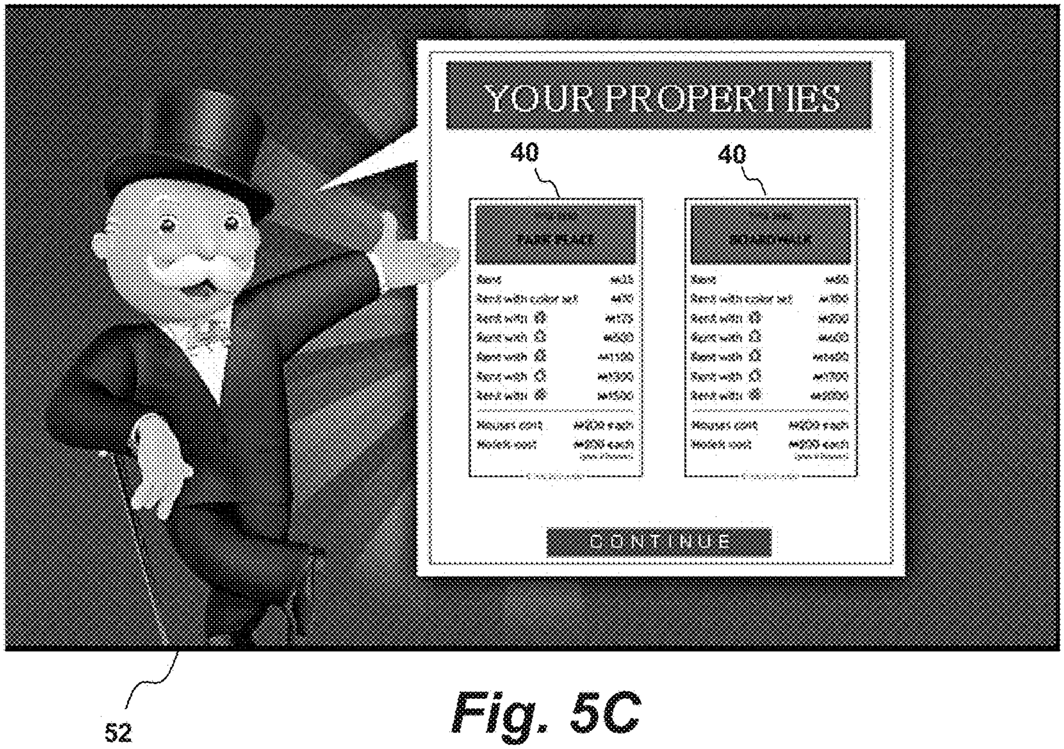

FIG. 5C is an example of a screen shot 52 provided to the player that tracks and updates the player’s accumulation of bonus game symbols. For example, the screen shot 52 informs the particular player that they have accumulated the “Park Place” and “Boardwalk” property locations.

Figure 5D:
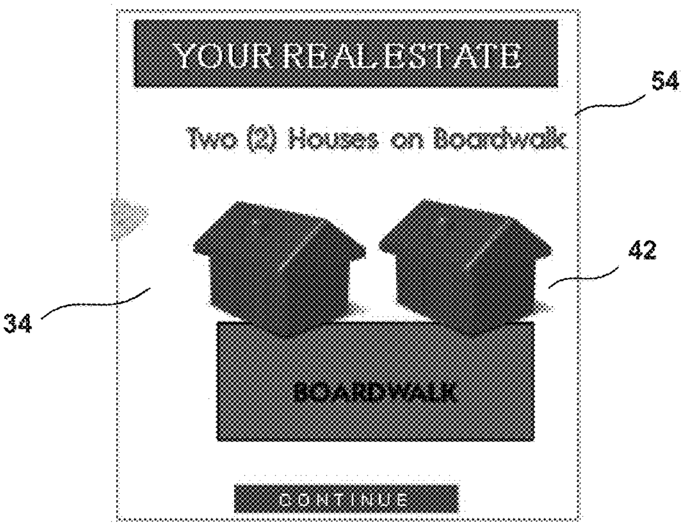
Figure 5E:
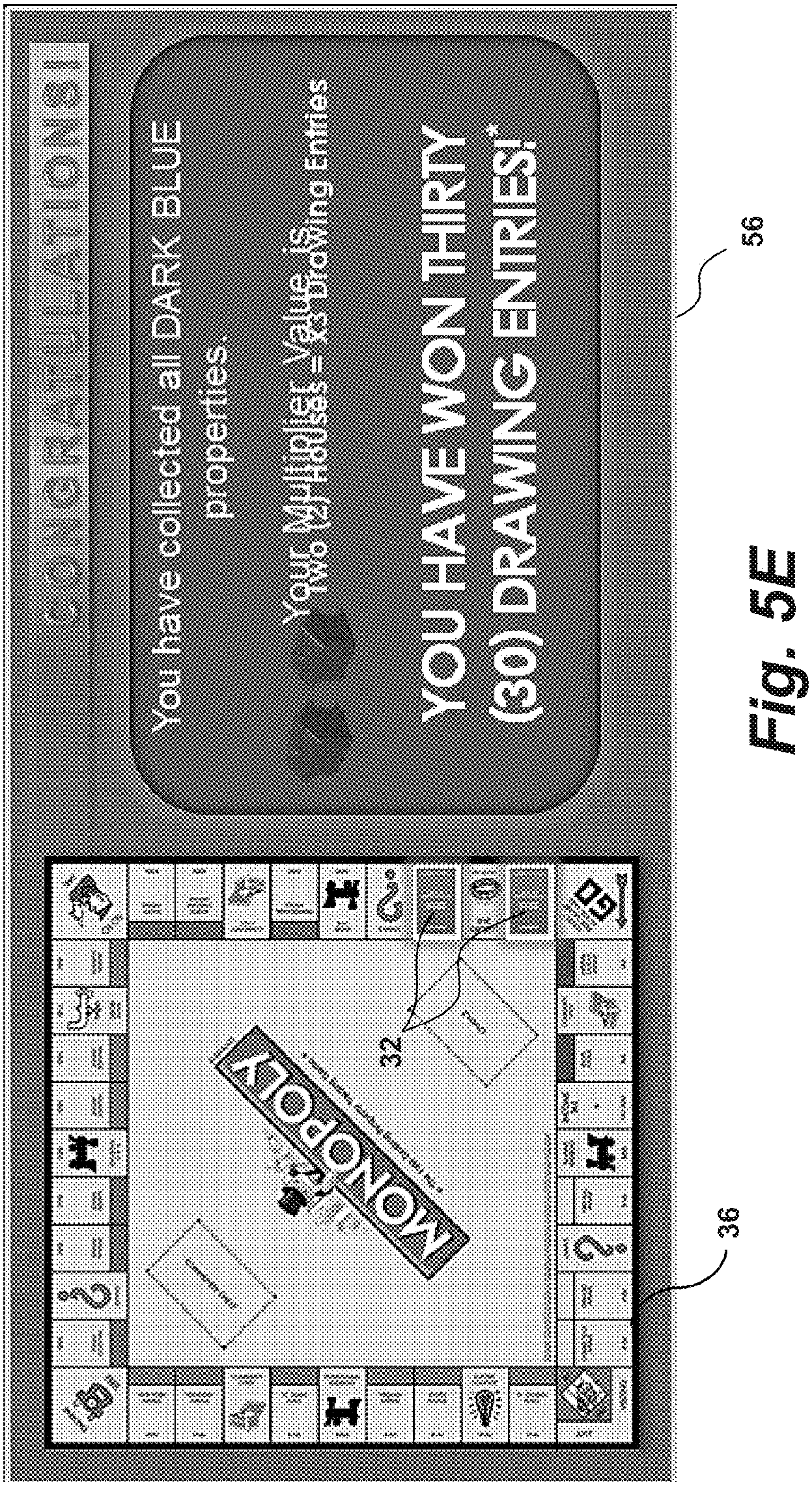

As mentioned above, the bonus game may include linking of a second primary game to the bonus game. In this regard, referring to FIG. 5A, the second game ticket 24 is embodied as an instant lottery scratch-off ticket having any manner of game indicia 26 relating to the overall MONOPOLY game theme. With this embodiment, however, the second bonus game symbol is not provided directly on the ticket 24. The player is provided instructions 46 on the ticket 24 to access the bonus game website, at which time the player will be provided the associated second bonus game symbol. For example, referring to FIG. 5D, the player may be provided a screen shot 54 identifying the second game symbol 34 that is linked to the bonus game. In the depicted embodiment, the second game symbol 34 is a house or hotel structure 42 built on one of the property locations on the MONOPOLY game board, such as “one hotel on Boardwalk” (as shown in FIG. 5D) or “two houses on Park Place”, and so forth. As with the conventional MONOPOLY game, a greater number of house or hotel structures 42 associated with a property increases the location’s value. For purposes of the bonus game 20, the structures 42 increase the number of entries into the bonus game 20 when the predefined set of property locations is completed by the player. For example, the screen shot 56 of FIG. 5E depicts the bonus game board 36 as a conventional MONOPOLY game board with the player’s accumulation of properties highlighted (the first bonus game symbols equating to particular property locations). The screen shot 56 also informs the player that they have satisfied one of the predefined sets 32 of first bonus game symbols (e.g., all of the dark blue properties). The enhancement value provided by the second game symbol 34 (FIG. 6D) associated with the particular set 32 of game symbols is a multiplier of 3× attached to the two house structures 42. Thus, the initial award of ten entries into the bonus game for accumulating Park Place and Boardwalk from the first primary lottery game is multiplied by a factor of 3 to grant the player thirty entries into the bonus game, as depicted in FIG. 5E.

Referring to the figures in general, the present invention also encompasses a game system that embodies many of the methodology aspects discussed above.

Embodiments of the methods and systems disclosed herein may be executed by one or more suitable networked lottery gaming systems. Such system(s) may comprise one or more computing devices adapted to perform one or more embodiments of the methods disclosed herein. Such gaming systems and computing devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

Any suitable computer-readable medium or media may be used to implement or practice the presently-disclosed subject matter, including, but not limited to, diskettes, drives, and other magnetic-based storage media, optical storage media, including disks (including CD-ROMS, DVD-ROMS, and variants thereof), flash, RAM, ROM, and other memory devices, and the like.

The present disclosure also makes reference to the transmission of communicated data over one or more communications networks. It should be appreciated that network communications can comprise sending and/or receiving information over one or more networks of various forms. For example, a network can comprise a dial-in network, a local area network (LAN), wide area network (WAN), public switched telephone network (PSTN), the Internet, intranet or other type(s) of networks. A network may comprise any number and/or combination of hard-wired, wireless, or other communication links.

Figure 6:
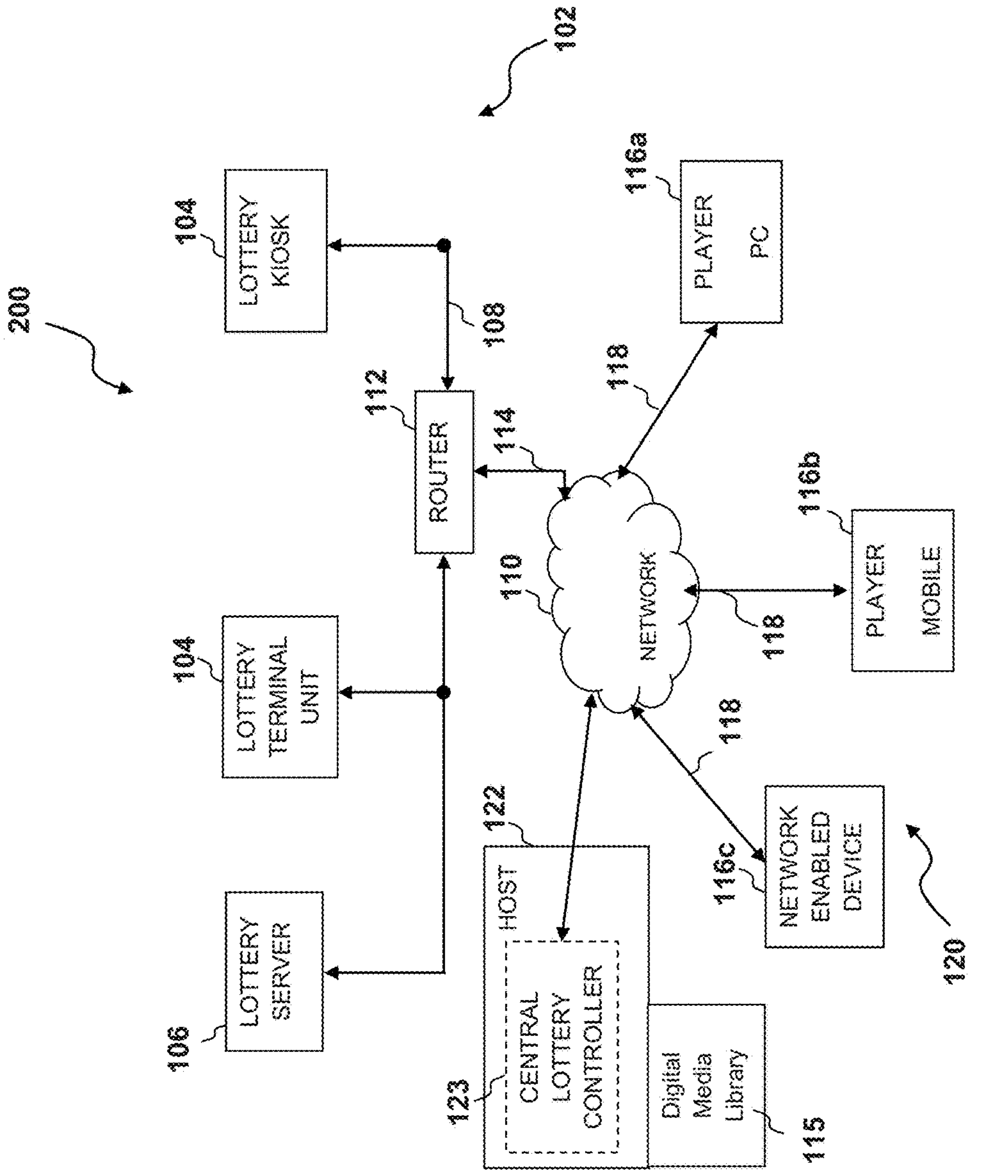
FIG. 6 is a block diagram view of a computer implemented system that may be used to practice the method and system of the present invention.

FIG. 6 is a diagram view of a representative gaming system 200 that may be used to practice aspects of the primary lottery and bonus game components in accordance with the present invention. The exemplary system 200 includes a central system 122 with a central controller 123 administered by a game provider that cooperates with one or more lottery jurisdictions to provide lottery products and services. It should be readily appreciated that the central controller 123 may include an integrated server, or the host central system 122 may include any manner of periphery server or other hardware structure. The host computer system 122 is configured to carry out the funding and gaming functions associated with the first and second primary games and bonus game program described herein.

The host central computer system 122 may be a single networked computer, or a series of interconnected computers having access to the network 110 via a gateway or other known networking system. Generally, the central controller 123 configured to communicate with, manage, execute and control individual terminal units 104 within the lottery jurisdiction, and to interface with the network enabled devices 116*a*, 116*b*, and 116*c* of the players for entry into and play of the bonus games, as described herein. The central controller 123 may include a memory for storing gaming procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 100.

The central controller 123 may be directly or indirectly connected through the I/O bus to any manner of peripheral devices such as storage devices, wireless adaptors, printers, and the like. In addition, a database (DB) may be communicatively connected to the central controller 123 and provide a data repository for the storage and correlation of information gathered from the individual terminal units 104 or devices 116. The information stored within the database may be information relating to individual players, games, or game card specific information.

Aspects of present system and method call for the players to interface with the host central computer system 122. This may be done directly, as illustrated in FIG. 6, or indirectly via the individual lottery jurisdiction servers 106. For example, the players may be provided with a website address printed on the first or second primary game tickets, whereby the player enters their game ticket into the bonus game program by accessing the central computer system 122 directly via a network enabled device 116*c* (for example, an Internet enabled PC 116*a*, or smart phone/mobile device 116*b*). Depending on the requirements of how the bonus games are actually conducted, the player may be directed to download gaming software to their PC or other network-enabled device that enables the player to perform all functions needed to participate in the second chance games. The network enabled devices 116 may be directly connected to the network 110 through a plurality of direct network links 118, thereby eliminating the need for the bus, router, or other networking equipment. The devices 116 are configured to execute one or more computer programs, such as an Internet browser program, to allow users to interact with the central computer system 122, and preferably include a visual display such as a monitor or screen. Alternatively, the visual display may be incorporated into a web-browser configured to display multimedia content. For instance, a player may access the system 122 remotely via an Internet web-browser on player device 116.

In one embodiment, the player's network enabled device may be located at a point of sale location for the first or second primary game lottery tickets, and may even be a part of the terminals 104. In this embodiment, a player may interact with the system 122 immediately after purchasing or receiving a primary game ticket.

Each lottery jurisdiction may be differently configured for purposes of carrying out various lottery functions within its borders. For purposes of discussion, each lottery jurisdiction may be considered as a node. The lottery jurisdiction nodes 120, in turn, may be directly connected and/or multiplexed to the network 110 via direct network links. Further, the direct network links may be secure communications channels physically hardened against tampering and/or the communications may be encrypted to prevent unauthorized access to information transmitted thereon.

With each lottery jurisdiction, a plurality of terminal units 104 may be provided at multiple locations and connected with a LAN or WAN. Further, the LAN and/or WAN connecting each of the terminal units 104 may include one or more separate and secure buses 108, routers 112, web servers 106, gateways and other networking equipment to provide continuous and/or redundant connectivity to the network 110. As discussed above, the network 110 may be communicatively connected to central host computers 122 and/or respective central controllers as well as associated databases to allow for implementation, storage, tracking and analysis of gaming and other features. The network 110 may also be connected to external systems (e.g., Facebook™ Twitter™, etc.) for different purposes. For example, the players may be notified through these external systems as to whether or not they won or lost in the primary or second chance games.

The terminal units 104 may be configured with any manner of hardware and software functionality to accept a player's entry and wager into a primary game, such as an on-line game or purchase of an instant game ticket. The terminal units 104 may also be configured for redeeming a player's game ticket after completion of the primary game, or completion of the second chance game of the player's choice. For example, the terminals may issue a credit slip that the player uses to collect their prize award at an establishment's cashier or an authorized lottery redemption center.

The terminals 104 may include any conventional feature known to those skilled in the art related to lottery terminals. The terminal 14 includes features and functionality to allow a player or retail clerk to enter the information required to participate in the lottery game. An exemplary terminal 14 includes a housing, one or more input devices, which may be a control panel having input keys, a display, a value input device such as a card reader, a play slip or ticket reader, and a ticket printer. The play slip reader is typically configured to read user selection marks, bar codes, magnetically stored information, or any other desired input information. Control panel input keys allow the player or retail clerk to select the game to be played, input the value to be wagered, manually enter selected lottery characters, and input any other information necessary to play the lottery game. The terminal may include a display which may be an LCD, a CRT, or touch-screen capable of receiving and displaying information related to the game. The value input device may include any device that can accept value or a wager from a customer, such as a card reader or an optical currency collector. The value input device may be integrated with external devices, such as a cash register or other retail terminals, to exchange information necessary to receive and record the wagering transaction. The game ticket printer may be used to print or otherwise encode game tickets with information selected or required to play the lottery game. The printer may provide game tickets that reflect a player's selection, or complete lottery slips if the selection was generated automatically by the terminal. It should be readily appreciated that particular embodiments of terminals 14 are not meant as a limitation of the invention, and that embodiments of the present invention may encompass any configuration of features and functionality to allow initiation and playing of a lottery game.

It should be appreciated by those skilled in the art that various modifications and variations may be made present invention without departing from the scope and spirit of the invention. It is intended that the present invention include such modifications and variations as come within the scope of the appended claims.

What is claimed is:

1. A method for conducting a lottery game in conjunction with a televised game show and a play-at-home version of the televised game show, comprising:

establishing a primary lottery game in one or more lottery jurisdictions wherein players purchase lottery tickets to play the primary lottery game;

establishing a televised game show wherein the players of the primary lottery game become eligible to be selected as a contestant in the televised game show by accumulating a predefined set of game symbols, the televised game show having one or more games wherein winning contestants are awarded a prize, and the televised game show including one or more future episodes;

providing a web code on the lottery tickets, the web code unique to each of the lottery tickets;

during broadcast of the televised game show in the one or more lottery jurisdictions, providing the players who are also at-home viewers of the televised game show with a plurality of game symbol codes;

enabling the players to access a website, enter the web code from a lottery ticket purchased by the respective player, enter one of the game symbol codes broadcast during the televised game show, and play a web-based game to win a game symbol associated with the entered game symbol code, the game symbol being one of the predefined set of game symbols and being accumulated by the respective player towards the predefined set of game symbols;

configuring each of the lottery tickets in the primary lottery game with a respective one of the predefined set of game symbols printed thereon, wherein the players also accumulate game symbols toward the predefined set of game symbols by purchase of the lottery tickets in the primary lottery game, wherein the game symbols accumulated by the players via play of the web-based game and play of the primary lottery game are combined to satisfy the predefined set of game symbols to become eligible as a contestant in the televised game show; and providing the players with a game board that is specifically configured for use in tracking status of the game symbols accumulated by the player from play of the web-based game and purchase of the lottery tickets in the primary lottery game;

wherein upon acquiring all of the game symbols in the predefined set of game symbols, the player advances towards being selected as a contestant in one of the future episodes of the televised game show.

2. The method as in claim 1, wherein the game symbols are for play of a bonus game component of the primary lottery game that requires the player to collect the predefined set of game symbols for entry into a pool, and periodically conducting bonus game drawings such that at least one of the players in the pool is selected as a winner in each bonus game drawing.

3. The method as in claim 2, wherein the winners in the bonus game drawings are invited to be an audience member in one of the future episodes of the televised game show and eligible for selection as a contestant in the future televised game show.

4. The method as in claim 2, wherein each lottery jurisdiction conducts respective bonus game drawings and has a defined minimum number of winners from their respective bonus game drawings present in an audience in the future episode of the televised game show, wherein contestants in the future episode of the televised game show are then randomly drawn from an entirety of the audience.

5. The method as in claim 2, wherein each lottery jurisdiction conducts respective bonus game drawings and has a defined minimum number of winners from their respective bonus game drawings present in an audience in the future episode of the televised game show, wherein at least one contestant in the future episode of the televised game show is then randomly drawn from each lottery jurisdiction such that each lottery jurisdiction has at least one contestant in the future episode of the televised game show.

6. The method as in claim 1, wherein upon satisfaction of the predefined set of game symbols, the players are awarded a defined number of entries in a bonus game drawing.

7. The method as in claim 6, wherein the defined number of entries is multiplied as a function of a multiplier symbol earned by participation of the player in a second primary lottery game that is played separately from the primary lottery game.

8. The method as in claim 1, wherein the game board has a MONOPOLY game theme, the game symbols identify sets of property locations on the MONOPOLY game board.

9. The method as in claim 8, wherein the game board is a virtual game board provided to the players via the website or a different website accessible by the players.

10. The method as in claim 9, further comprising establishing individual player accounts that are accessible by the players via the website, the player accounts including the virtual game board updated with a status of the game symbols accumulated by the player.

11. The method as in claim 1, wherein the game symbols associated with the game symbol codes are made known to the player prior to selection and entry of a particular game symbol code by the player during at-home viewing of the televised game show.

12. The method as in claim 1, wherein the game symbol codes limit at-home play of the web-based game to a time corresponding to broadcast of the televised game show within the lottery jurisdiction where the player is located.

13. The method as in claim 1, wherein the game symbol codes are episode specific and valid only once and only during a broadcast time of the televised game show in which the game symbol codes are provided.

14. The method as in claim 13, wherein the game symbol codes are also geographic specific and valid only in a specific geographic region of a particular one of the lottery jurisdictions.

15. The method as in claim 1, wherein the primary lottery game is established in a plurality of the lottery jurisdictions, each of the tottery jurisdictions being geographically distinct and the televised game show is broadcast in each of the lottery jurisdictions, wherein a unique set of the game symbol codes is assigned to each of the lottery jurisdictions such that the at-home viewer must use the unique game symbol codes assigned to their respective lottery jurisdiction to play the web-based game.

* * * * *